(12) United States Patent
Masamoto et al.

(10) Patent No.: US 10,416,487 B2
(45) Date of Patent: Sep. 17, 2019

(54) ILLUMINATION DEVICE AND LIQUID CRYSTAL DISPLAY DEVICE

(71) Applicant: Japan Display Inc., Tokyo (JP)

(72) Inventors: Taketoshi Masamoto, Tokyo (JP); Kosuke Matsubara, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/034,486

(22) Filed: Jul. 13, 2018

(65) Prior Publication Data

US 2019/0018276 A1   Jan. 17, 2019

(30) Foreign Application Priority Data

Jul. 14, 2017   (JP) .................................. 2017-138548

(51) Int. Cl.
   *F21V 7/04*   (2006.01)
   *G02F 1/1333*   (2006.01)
   *F21V 8/00*   (2006.01)

(52) U.S. Cl.
   CPC ....... *G02F 1/133308* (2013.01); *G02B 6/005* (2013.01); *G02B 6/0043* (2013.01); *G02B 6/0081* (2013.01); *G02B 6/0091* (2013.01); *G02B 6/0051* (2013.01); *G02B 6/0053* (2013.01); *G02B 6/0055* (2013.01); *G02B 6/0083* (2013.01); *G02F 2001/133317* (2013.01)

(58) Field of Classification Search
   None
   See application file for complete search history.

(56) References Cited

U.S. PATENT DOCUMENTS

| 6,219,117 B1 | 4/2001 | Nagakubo et al. |
| 6,313,891 B1 | 11/2001 | Nagakubo et al. |
| 2012/0140447 A1 | 6/2012 | Yamamoto et al. |

FOREIGN PATENT DOCUMENTS

| JP | H10-170919 A | 6/1998 |
| JP | 2012-119247 A | 6/2012 |

*Primary Examiner* — Vip Patel
(74) *Attorney, Agent, or Firm* — K&L Gates LLP

(57) ABSTRACT

According to one embodiment, an illumination device includes a light guide, a light source device and an optical sheet. The light guide has an emission surface and side surfaces which intersect the emission surface, and at least one side surface is located inside a display area. The light source device emits light to the light guide. The optical sheet is provided on the emission surface and is opposed to the display area. The optical sheet has an edge portion which covers an area between the one side surface and an edge of the display area, and a transmittance adjustment area which is provided in the edge portion and reduces a transmittance of the edge portion.

16 Claims, 13 Drawing Sheets

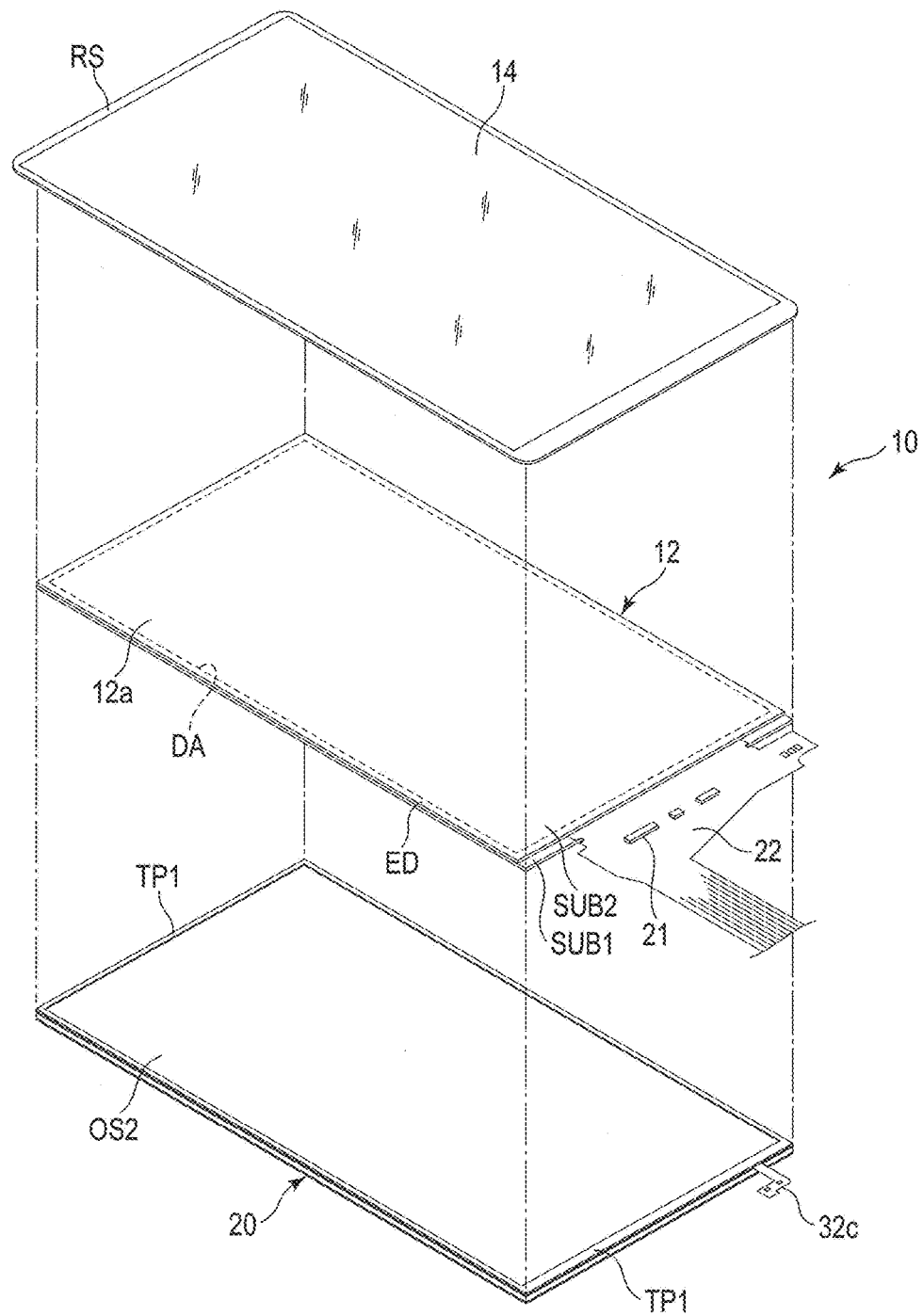
F I G. 2

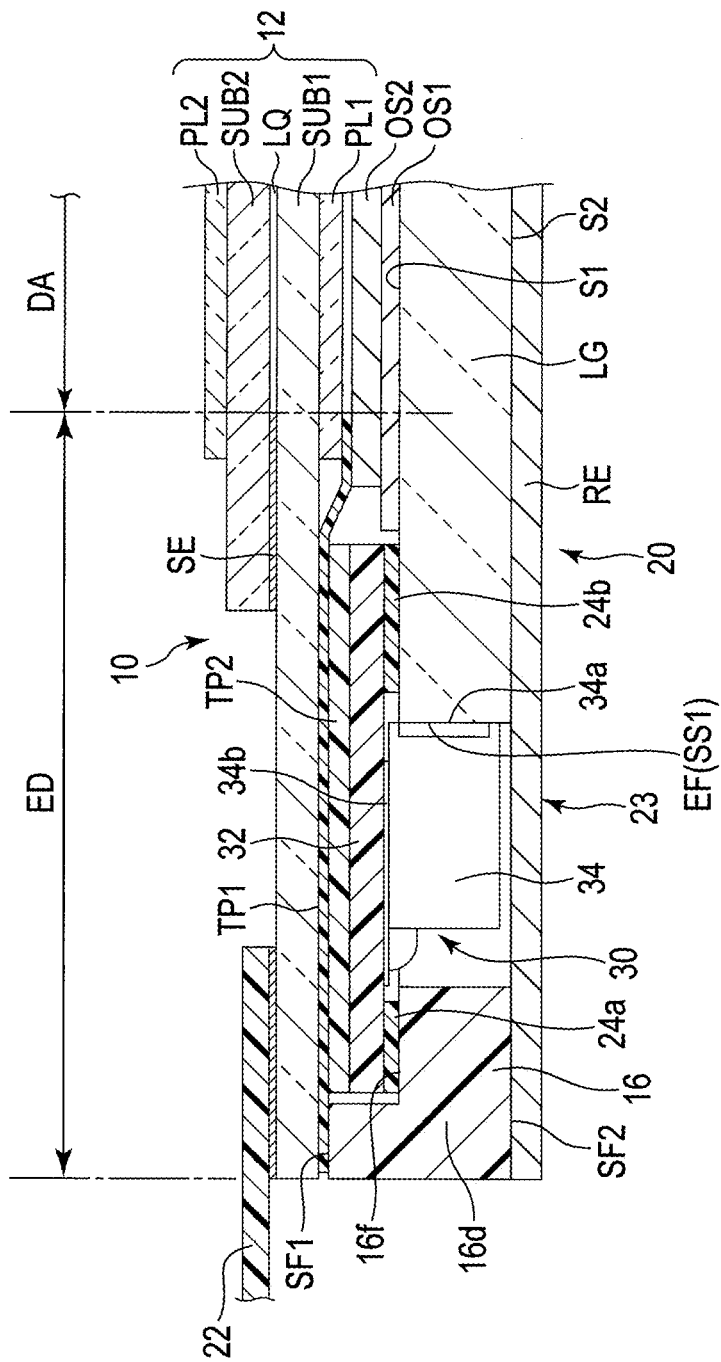
F I G. 4

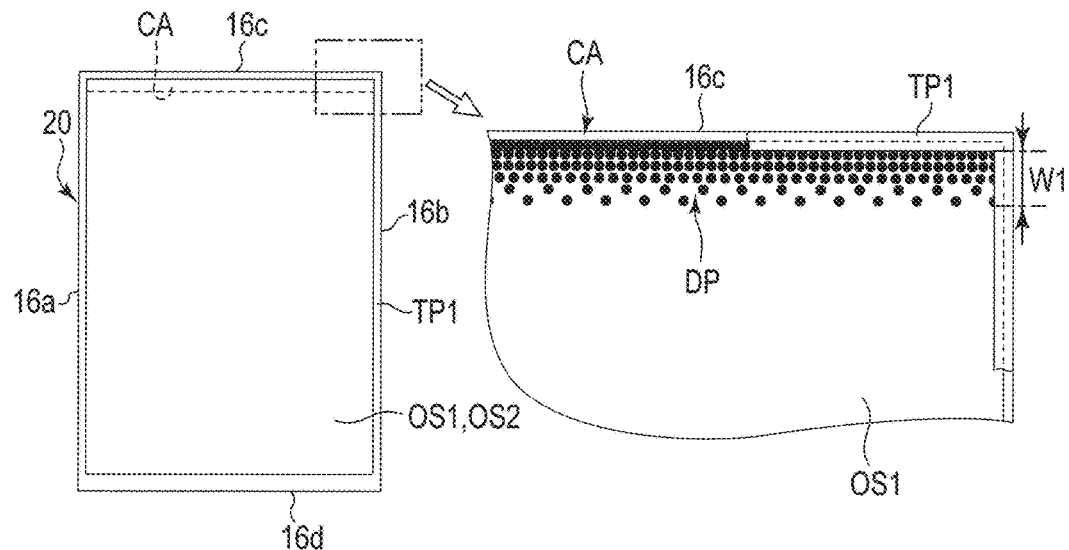
F I G. 7A  F I G. 7B
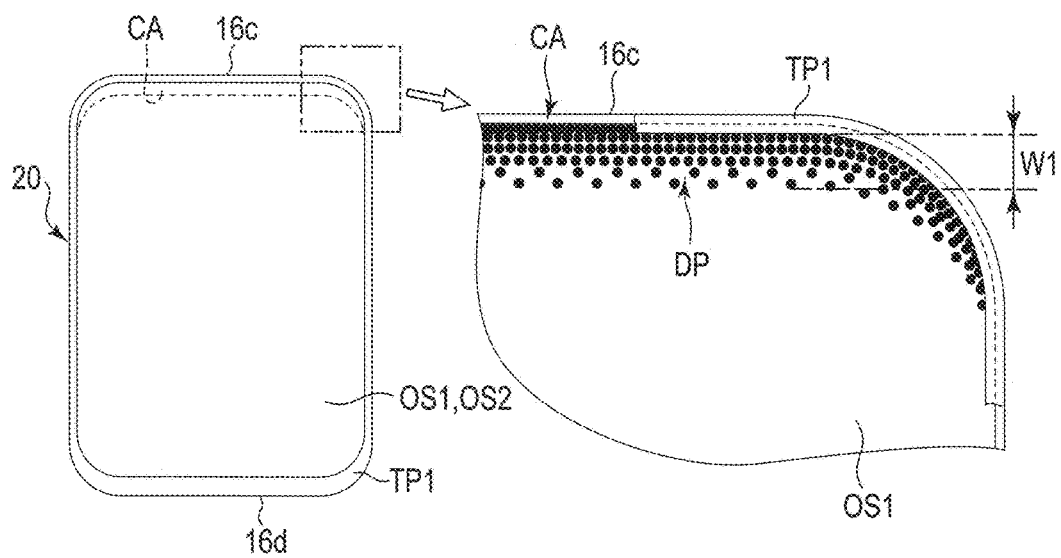
F I G. 8A  F I G. 8B

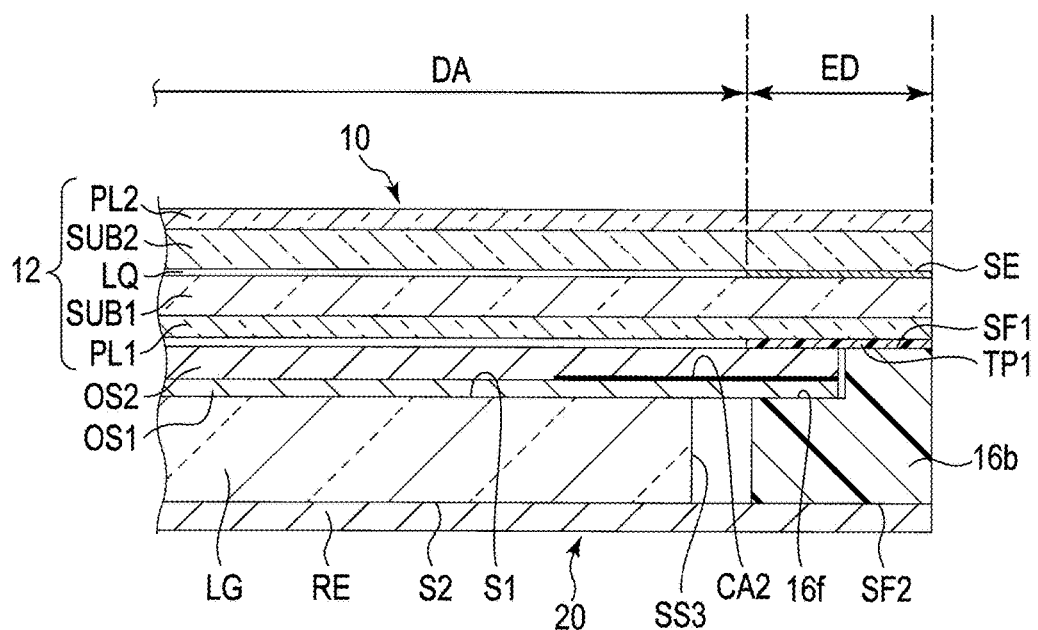
F I G. 12

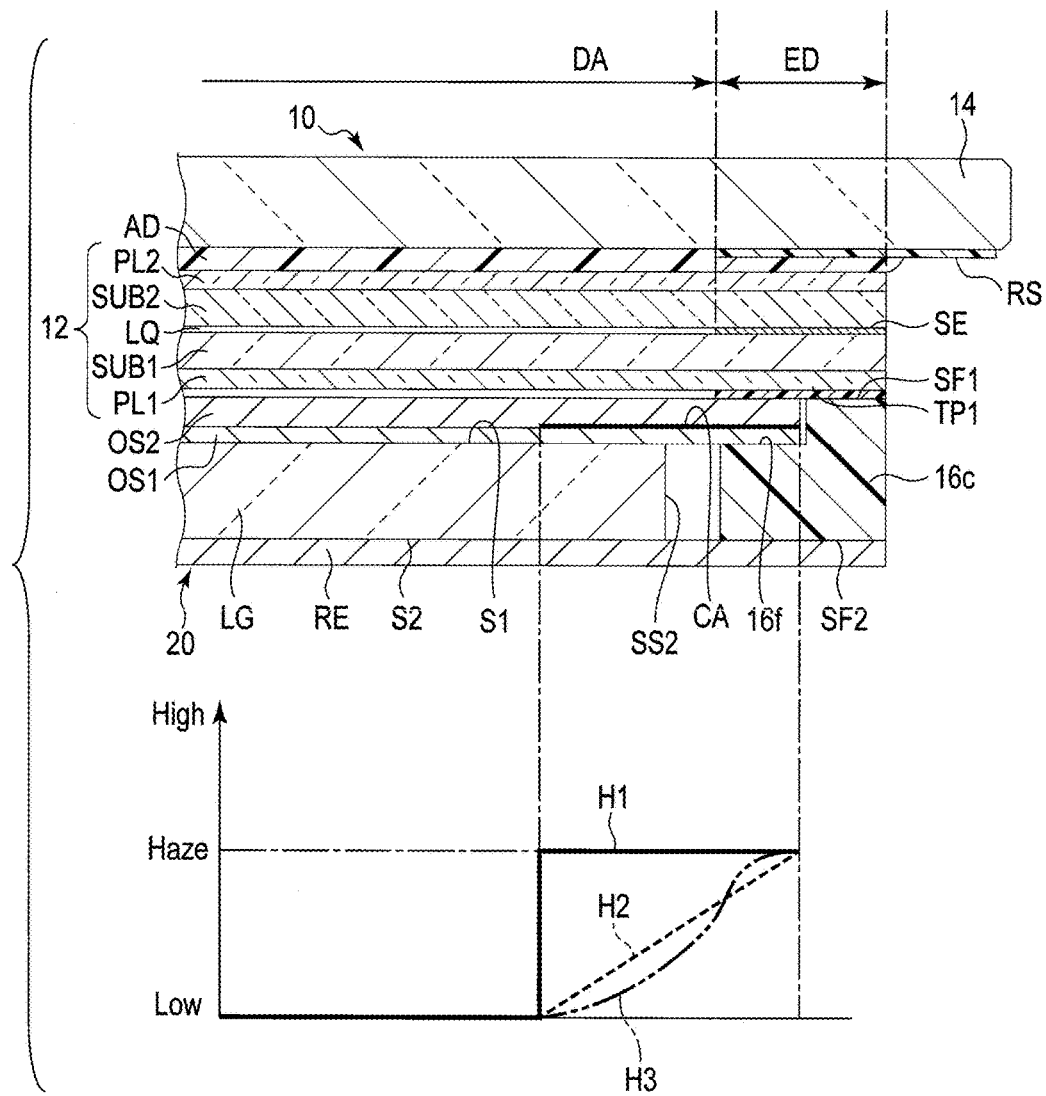
F I G. 21 ically, one embodiment, there is provided an illumination device comprising:

ILLUMINATION DEVICE AND LIQUID CRYSTAL DISPLAY DEVICE

CROSS-REFERENCE TO RELATED APPLICATIONS

This application is based upon and claims the benefit of priority from Japanese Patent Application No. 2017-138548, filed Jul. 14, 2017, the entire contents of which are incorporated herein by reference.

FIELD

Embodiments described herein relate generally to an illumination device and a liquid crystal display device comprising the same.

BACKGROUND

Liquid crystal display devices are widely used as display devices of smartphones, tablet computers, car navigation systems and the like. In general, a liquid crystal display device comprises a liquid crystal panel and an illumination device which is overlaid on the rear surface of the liquid crystal panel and illuminates the liquid crystal panel. The illumination device includes a frame (or bezel), a reflective layer, a light guide, an optical sheet (prism sheet, diffusion sheet), a light source device (light source unit) which supplies light to be emitted to the light guide, etc. The light source unit includes a wiring substrate such as an FPC and a plurality of light sources (such as light-emitting diodes or LEDs) mounted on the wiring substrate. The illumination device is fixed to the rear surface of the liquid crystal panel with, for example, a double-faced tape and is held at a predetermined position.

Recently, there has been a demand to further narrow the frame of the liquid crystal display device. In the case of narrowing the frame, the frame of the liquid crystal panel and the frame of the illumination device need to be narrowed, but also the dimension margin of each component needs to be reduced. In this case, the size of the light guide may become smaller than the size of the display area of the liquid crystal panel. In the above-described design, light is emitted from an edge portion of the light guide, and an edge of the light guide becomes abnormally luminous. Accordingly, a frame peripheral portion of the display area will be brightly illuminated.

SUMMARY

The present application relates generally to an illumination device and a liquid crystal display device including the same According to one embodiment, an illumination device includes a light guide, a light source device and an optical sheet. The light guide has an emission surface and side surfaces which intersect the emission surface, and at least one side surface is located inside a display area. The light source device emits light to the light guide. The optical sheet is provided on the emission surface and is opposed to the display area. The optical sheet has an edge portion which covers an area between the one side surface and an edge of the display area, and a transmittance adjustment area which is provided in the edge portion and reduces a transmittance of the edge portion.

BRIEF DESCRIPTION OF THE DRAWINGS

FIG. 2 is an exploded perspective view of the liquid crystal display device.

FIG. 4 is a sectional view of a light source side portion of the liquid crystal display device along line A-A of FIG. 1.

FIG. 7A is a plan view of the illumination device.

FIG. 7B is an enlarged plan view of a part of the illumination device shown in FIG. 7A.

FIG. 8A is a plan view of an illumination device according to a first modification of the first embodiment.

FIG. 8B is an enlarged plan view of a part of the illumination device shown in FIG. 8A.

FIG. 12 is a sectional view of a long side portion of a liquid crystal display device according to a second embodiment along line C-C of FIG. 1.

FIG. 21 is a sectional view of a part of a liquid crystal display device according to a fifth embodiment and a diagram showing an example of haze adjustment of an optical sheet.

DETAILED DESCRIPTION

Figure 1:
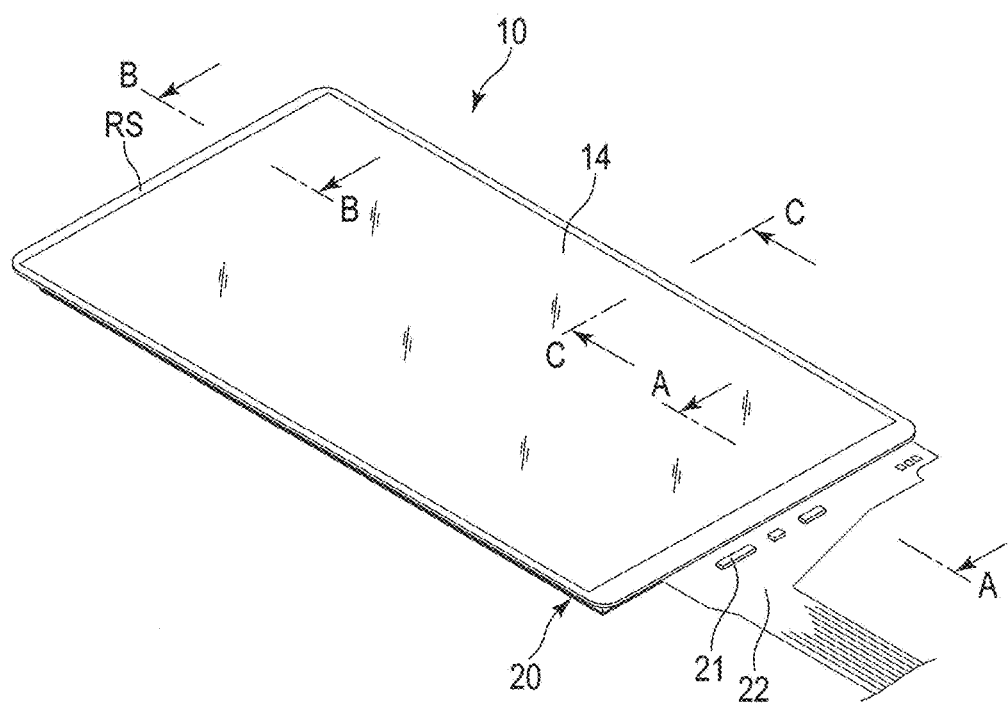
FIG. 1 is a perspective view showing a display surface side of a liquid crystal display device according to a first embodiment.

Various embodiments will be described hereinafter with reference to the accompanying drawings. In general, according to one embodiment, an illumination device comprises a light guide, a light source device and an optical sheet. The light guide comprises an emission surface and a plurality of side surfaces which intersect the emission surface, and at least one side surface is located inside a display area. The light source device emits light to the light guide. The optical sheet is provided on the emission surface and is opposed to the display area. The optical sheet includes an edge portion which covers an area between the one side surface and an edge of the display area, and a transmittance adjustment area which is provided in the edge portion and reduces a transmittance of the edge portion.

The disclosure is merely an example, and proper changes in keeping with the spirit of the invention, which are easily conceivable by a person with ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

FIG. 1 is a perspective view of a display surface side of a liquid crystal display device according to the first embodiment, and FIG. 2 is an exploded perspective view of the liquid crystal display device.

A liquid crystal display device 10 can be used in various electronic devices such as a smartphone, a tablet computer, a cell phone, a notebook computer, a portable game console, an electronic dictionary, a television device or a car navigation system.

As shown in FIGS. 1 and 2, the liquid crystal display device 10 comprises an active-matrix liquid crystal display panel (hereinafter referred to as a liquid crystal panel) 12, a cover panel 14 which is overlaid on one surface of the liquid crystal panel 12, i.e., a display surface 12a of the liquid crystal panel 12 and covers the entire display surface 12a, and an illumination device 20 which is arranged on the other surface of the liquid crystal panel 12, i.e., the rear surface of the liquid crystal panel 12.

Figure 5:
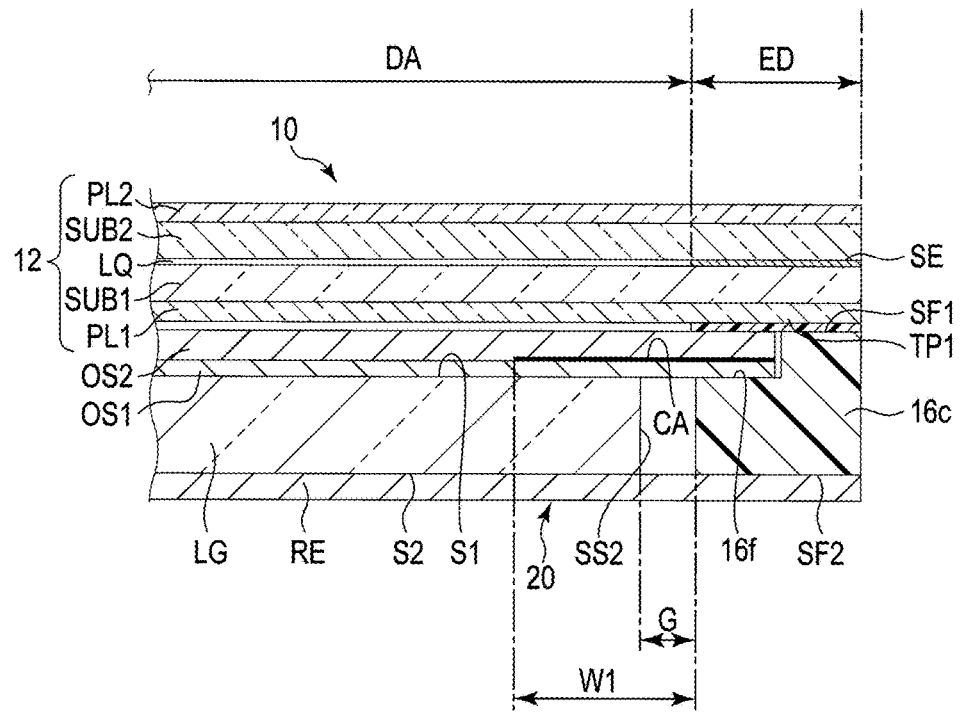
FIG. 5 is a sectional view of a portion of the liquid crystal display device on the opposite side to light sources along line B-B of FIG. 1.

FIG. 4 is a sectional view of a light source side portion of the liquid crystal display device along line A-A of FIG. 1, and FIG. 5 is a sectional view of a portion of the liquid crystal display device on the opposite side to light sources along line B-B of FIG. 1. As shown in FIGS. 2, 4 and 5, the liquid crystal panel 12 comprises a first substrate SUB1 which has the shape of a rectangular plate, a second substrate SUB2 which is opposed to the first substrate SUB1 and has the shape of a rectangular plate, and a liquid crystal layer LQ which is held between the first substrate SUB1 and the second substrate SUB2. Each of the first substrate SUB1 and the second substrate SUB2 is formed of a transparent insulating substrate such as a glass plate or resin plate. A peripheral portion of the second substrate SUB2 is attached to the first substrate SUB1 with a frame-shaped sealing member SE. A polarizer PL2 is attached to a surface of the second substrate SUB2 and forms the display surface 12a of the liquid crystal panel 12. A polarizer PL1 is attached to a surface of the first substrate SUB1 (the rear surface of the liquid crystal panel 12).

In the liquid crystal panel 12, a rectangular display area (active area) DA is provided in an area inside the sealing member SE in a plan view of the display surface 12a (which corresponds to a view of the liquid crystal panel in the normal direction of the surface of the liquid crystal panel and will hereinafter corresponds to the same). An image is displayed in the display area DA. A rectangular frame area (non-display area) ED is provided around the display area DA. The liquid crystal panel 12 has a transmissive display function of displaying an image by selectively transmitting light emitted from the illumination device 20 to the display area DA.

In the example illustrated, a flexible printed circuit (FPC) 22 is connected to a short side end portion of the first substrate SUB1 and extends outward from the liquid crystal panel 12. A semiconductor element such as a driver IC chip 21 is mounted on the FPC 22 as a signal supply source which supplies a signal necessary for driving the liquid crystal panel 12.

As shown in FIGS. 1 and 2, the cover panel 14 is formed of, for example, a glass plate or transparent acrylic resin and has the shape of a rectangular plate. The cover panel 14 covers the entire display surface 12a of the liquid crystal panel 12. A frame-shaped light-shielding layer RS is formed in a peripheral portion of the rear surface (surface on the liquid crystal panel 12 side or surface on the opposite side to the surface opposed to the viewer) of the cover panel 14. The light-shielding layer RS may be formed on the upper surface (display surface) of the cover panel 14. The rear surface (back surface) of the cover panel 14 is attached to the polarizer PL2 of the liquid crystal panel 12 with a light transmissive adhesive, for example, an adhesive sheet formed of a transparent optical resin.

In the present embodiment, both end portions of the cover panel 14 on the longer side slightly extend beyond both edges of the liquid crystal panel 12 on the longer side. Side edge portions of the cover panel 14 on the shorter side extend outward beyond short sides of the liquid crystal panel 12.

Figure 3:
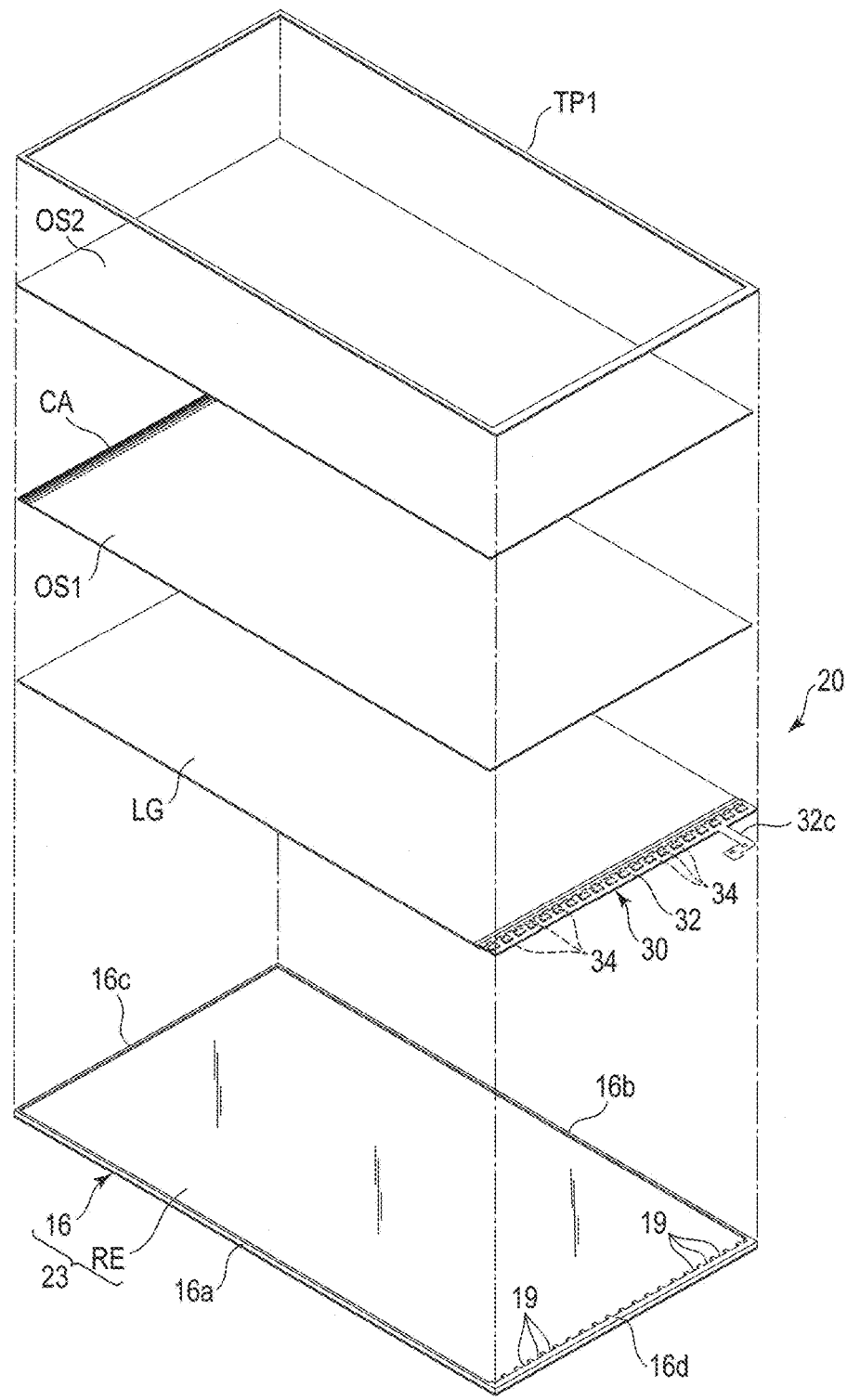
FIG. 3 is an exploded perspective view of an illumination device of the liquid crystal display device.

FIG. 3 is an exploded perspective view of the illumination device 20. As shown in FIGS. 2 to 5, the illumination device 20 comprises a rectangular frame 16, a reflective sheet RE attached to a second surface (lower surface) SF2 of the frame 16, a plurality of optical members arranged in the frame 16, and a light source unit (light source device) 30 which supplies light to be emitted to the optical members. The reflective sheet RE has substantially the same outer dimensions (width and length) as those of the frame 16 and covers the lower surface of the frame 16. The frame 16 and the reflective sheet RE constitute a case (bezel) 23.

The frame 16 is molded of, for example, a synthetic resin such as polycarbonate. The frame 16 has a pair of long side portions 16a and 16b which are opposed to each other and a pair of short side portions 16c and 16d which are opposed to each other. The outer dimensions of the frame 16 are substantially the same as the outer dimensions of the liquid crystal panel 12. The frame 16 has a first surface (upper surface) SF1 on the liquid crystal panel 12 side and the second surface (lower surface) SF2 on the opposite side to the first surface SF1. The frame 16 has a sunken step portion 16f formed on the inner peripheral side of the first surface SF1. In the present embodiment, the height (depth) of the step portion 16f is about the same as the sum of the thicknesses of two optical sheets OS1 and OS2 which will be described later. A plurality of recessed portions 19 are provided at the inner edge of the short side portion 16d located on the light source side. A peripheral portion of the reflective sheet RE which constitutes the bottom of the case 23 is attached to the second surface SF2 of the frame 16.

The optical members of the illumination device 20 include a light guide LG mounted on the reflective sheet RE inside the frame 16 and a plurality of optical sheets, for example, two optical sheets, namely, the first optical sheet OS1 and the second optical sheet OS2 overlaid on the light guide LG.

The light guide LG is formed of a light transmissive resin, for example, a transparent resin such as acrylic or polycarbonate and has a substantially rectangular shape. In a plan view, the light guide LG has substantially the same width as that of the display area DA and has a length greater than the length of the display area DA. The light guide LG has a first main surface S1 serving as an emission surface, a second main surface S2 on the opposite side to the first main surface S1, and a plurality of side surfaces which extend in such a manner as to intersect the first main surface S1. In the present embodiment, one side surface SS1 of the light guide LG on the shorter side serves as an incident surface EF. The side surfaces of the light guide LG includes a second side surface SS2 located along a short side on the opposite side to light sources, and a pair of third side surfaces on the longer side located along the pair of long sides of the light guide LG.

The light guide LG is arranged inside the frame 16 and is mounted on the reflective sheet RE in a state where the second main surface S2 side is opposed to the reflective sheet RE. As shown in FIG. 4, the incident surface EF of the light guide LG is arranged outside the display area DA, more specifically, at a position overlapping the frame area ED, and is opposed to the short side portion 16d of the frame 16 at a distance from the short side portion 16d of the frame 16. As shown in FIG. 5, in the present embodiment, the second side surface SS2 of the light guide LG on the opposite side to the light sources is arranged on the inner side of the display area DA from the edge of the display area DA. The second side surface SS2 is opposed to the short side portion 16c of the frame 16 with a small gap G.

As the light guide LG is structured and arranged such that at least one side surface of the light guide LG is located inside the display area DA in this manner, the width or length of the frame 16 can be reduced or the frame 16 can be arranged more closely to the display area DA side. As a result, the frame of the illumination device 20 and the frame of the liquid crystal display device 10 can be narrowed.

As shown in FIGS. 3 and 4, the light source unit 30 comprises a strip-shaped printed circuit board (FPC) 32 and light sources mounted on the printed circuit board 32. According to the present embodiment, for example, light-emitting diodes (LEDs) 34, which are point light sources, are arranged at predetermined intervals as the light sources. Each LED 34 has an emission surface 34a and a mounting surface 34b which is perpendicular to the emission surface 34a. The LEDs 34 are arranged at predetermined intervals in the longitudinal direction of the printed circuit board 32 (in a direction parallel to the short side portion 16d of the frame 16). The mounting surface 34b of each LED 34 is mounted on the printed circuit board 32. Further, the printed circuit board 32 has a connection end portion 32c which extends from one side edge thereof.

One long side portion of the printed circuit board 32 is attached to the short side portion 16d of the frame 16 with an adhesive member, for example, a double-faced tape 24a, and the other long side portion of the printed circuit board 32 is attached to an end portion of the first main surface S1 of the light guide LG with a double-faced tape 24b. Accordingly, the LEDs 34 are arranged between the short side portion 16d of the frame 16 and the incident surface EF of the light guide LG, and the emission surfaces 34a of the LEDs 34 are opposed to or contact the incident surface EF. In the present embodiment, the LEDs 34 are arranged in the recessed portions 19 of the short side portion 16d.

A fluorescent tube or cathode-ray tube as a line light source is also adoptable as the light source. Alternatively, a line light source or surface light source in which organic EL light sources are elaborately arranged is also adoptable as the light source.

According to the present embodiment, for example, a diffusion sheet and a prism sheet formed of a synthetic resin such as polyethylene terephthalate and having light transmission characteristics are used as the first optical sheet OS1 and the second optical sheet OS2. As shown in FIGS. 3 to 5, each of the first and second optical sheets OS1 and OS2 has a rectangular shape and has a width slightly greater than the width of the light guide LG and a length slightly less than the length of the light guide LG. The dimensions of the optical sheets OS1 and OS2 are slightly greater than those of the display area DA of the liquid crystal panel 12.

The first optical sheet OS1 and the second optical sheet OS2 are overlaid in this order on the first main surface S1 of the light guide LG. In each of the first and second optical sheets OS1 and OS2, at least three side edge portions except for a side edge portion on the light source side are mounted on the step portion 16f of the frame 16. As shown in FIG. 5, side edge portions of the first and second optical sheets SO1 and OS2 on the opposite side to the light sources (on the shorter side) cover an area between the second side surface SS2 of the light guide LG and the edge of the display area DA and the gap G between the second surface SS2 and the frame short side portion 16c. A transmittance adjustment area (dimming area) CA which will be described later is formed in the above-described edge portion of at least one of the first optical sheet OS and the second optical sheet OS2.

The number of optical sheets is not limited to two and may be three or more or may be one.

As shown in FIGS. 2 to 5, the illumination device 20 comprises a double-faced tape TP1. The double-faced tape TP1 has a base and adhesive layers provided on both surfaces of the base. At least one of the base and the adhesive layers are colored in black. Therefore, the double-faced tape TP1 also functions as a light-shielding tape having light-shielding characteristics. The double-faced tape TP1 is attached to the upper surface (the first surface SF1) of the frame-shaped frame 16. The outer dimensions of the double-faced tape TP1 are substantially the same as the outer dimensions of the frame 16. The widths of a pair of long side portions and a short side portion on the opposite side to the light sources in the double-faced tape TP1 are substantially the same as the widths of the long side portions 16a and 16b and the short side 16c in the frame 16. A short side portion of the double-faced tape TP1 on the light source side is wider than the other side portions. Accordingly, the double-faced tape TP1 is attached to the upper surface SF1 and the peripheral portion of the second optical sheet OS2 in the pair of long side portions 16a and 16b and the short side portion 16c. Further, the short side portion of the double-faced tape TP1 on the light source side is attached to the upper surface SF1 of the short side portion 16d of the frame 16, the FPC 32 and the end portion of the second optical sheet OS2. The double-faced tape TP1 is attached to the FPC 32 via a double-faced tape TP2.

The illumination device 20 is opposed to the rear surface of the liquid crystal panel 12 and is attached to the first substrate SUB1 or the polarizer PL1 with the double-faced tape TP1. The FPC 32 of the light source unit 30 is connected to the FPC 22 via the connection end portion 32c (see FIGS. 1 and 2). A drive current passes through the LEDs 34 via the FPC 22 and the FPC 32. The light emitted from the LEDs 34 enters the light guide LG from the incident surface EF of the light guide LG, travels through the light guide LG or is reflected off a reflective plate, and is emitted from the first main surface (emission surface) S1 to the liquid crystal panel 12 side.

As shown in FIG. 5, when the second side surface (end on the opposite side to the light sources) SS2 of the light guide LG is arranged inside the display area DA, the edge portion of the display area DA may be brightly illuminated with light leaking from the second side surface SS2. Therefore, according to the present embodiment, the transmittance adjustment area (dimming area) CA which reduces the transmittance of the optical sheet is provided in the edge portion of at least one optical sheet, here, the first optical sheet OS1.

FIG. 7A is a plan view schematically showing the illumination device 20, and FIG. 7B is an enlarged plan view of an edge portion of the illumination device 20 on the opposite side to the light sources in which the second optical sheet is omitted.

As shown in FIGS. 3, 5, 7A and 7B, the edge portion of the first optical sheet OS1 on the opposite side to the light sources forms the transmittance adjustment area CA. The transmittance adjustment area CA extends along the short side of the first optical sheet OS1 throughout the entire length of the short side and has a width W1. According to the present embodiment, the transmittance adjustment area CA has, for example, a dot pattern (print layer) DP printed with black ink in an end portion of the upper surface (surface on the liquid crystal panel 12 side) of the first optical sheet OS1. As shown in FIG. 7B, the dot pattern DP has a plurality of dot lines which extend parallel to the short side of the first optical sheet OS1, and each dot line has a large number of circular dots arranged with predetermined pitches. Each dot line extends throughout the entire length of the short side. The dot lines are arranged in a direction perpendicular to the short side from the short side edge of the first optical sheet OS 1 within the range of the width W1. Although circular dots are shown in the example illustrated, the shape of the dots is not limited to this shape and may be a polygonal shape, an elliptical shape, etc.

The width W1 of the transmittance adjustment area CA, that is, the width W1 of an area having the dot pattern DP is the distance between the inner peripheral edge of the double-faced tape TP1 and an edge (first edge) of the dot pattern DP on the center side. The width W1 is set to be greater than the distance between the second side surface SS2 of the light guide LG and the edge of the display area DA. For example, the width W1 is about 1 to 3 mm. The dot pattern DP is also formed at an edge (second edge) of the first optical sheet OS1 on the shorter side, but this portion is covered with the double-faced tape TP1 having light-shielding characteristics. A part of light emitted from the second side surface SS2 of the light guide LG is blocked by the double-faced tape TP1. Therefore, the effective width of the area having the dot pattern DP is defined as the width W1 between the inner peripheral edge of the double-faced tape TP1 and the center side edge of the area having the dot pattern DP.

In the present embodiment, dots having the same diameter are used as the circular dots of the dot pattern DP. Further, the transmittance may be increased by adding gradations to the dot pattern from the outer edge to the inner side of the optical sheet OS1. For example, the pitch of the dots in the dot line is gradually increased from the outer edge to the inner side, that is, the density of the dots is gradually reduced from the outer edge to the inner side of the optical sheet OS1. Accordingly, the border of the dot pattern (print layer) DP can be made less visible.

When the light emitted from the light guide LG passes through the transmittance adjustment area CA of the first optical sheet OS1, a part of the light is blocked by the dot pattern DP and only a part of the light is transmitted through the first optical sheet. That is, the transmittance of the dot pattern (print layer) DP is lower than the transmittance of the first optical sheet OS1. Therefore, the transmittance of the transmittance adjustment area CA decreases.

Figure 6:
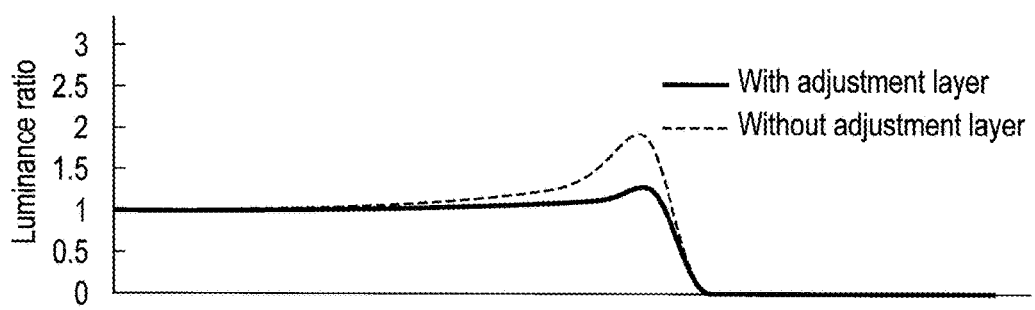
FIG. 6 is a diagram showing a comparison between the luminance distribution of the opposite side portion of the liquid crystal display device shown in FIG. 5 which comprises an adjustment area and the luminance distribution of the opposite side portion of the liquid crystal display device shown in FIG. 5 which does not comprise an adjustment area.

FIG. 6 shows the luminance distribution of a portion of the liquid crystal display device and a portion of the illumination device on the opposite side to the light sources. A comparison between the luminance distribution with the transmittance adjustment area CA (the present embodiment) and the luminance distribution without the transmittance adjustment area is illustrated. As shown in FIGS. 5 and 6, as the transmittance adjustment area CA is provided at a position covering the gap between the second side surface SS2 of the light guide LG and the edge of the display area DA, the transmittance of the end portion of the first optical sheet OS1 on the opposite side to the light sources is reduced, and therefore the amount of light of abnormal light emission which is transmitted through this area can be reduced. As a result, as shown in FIG. 6, the luminance of the edge portion of the display area DA is significantly lower than that of the case without the transmittance adjustment area and is substantially the same as the luminance of the other area of the display area DA. Consequently, the edge portion of the display area DA will not be brightly illuminated, and the display quality of the liquid crystal display device will be improved.

According to the illumination device 20 and the liquid crystal display device 10 according to the first embodiment which are structured as described above, the frame of the illumination device and the frame of the liquid crystal display device can be further narrowed by arranging at least one edge of the light guide LG inside the effective display area DA. Concurrently, the emission of abnormal light can be reduced and the display quality can be improved by providing the transmittance adjustment area CA in the optical sheet. From the above, according to the first embodiment, an illumination device having a narrower frame and a liquid crystal display device comprising this illumination device can be obtained.

The transmittance adjustment area CA is provided in the first optical sheet OS1 in the first embodiment, but the transmittance adjustment area CA is not necessarily provided there and may be provided in the second optical sheet OS2. For example, it is possible to apply such a structure that the same dot pattern (print layer) DP is formed as the transmittance adjustment area CA in the edge portion of the lower surface (surface on the light guide side) of the second optical sheet OS2.

Further, the transmittance adjustment area CA is provided in a part of the edge portion of the first optical sheet OS1 on the opposite side to the light sources in the present embodiment, but the transmittance adjustment area CA is not necessarily provided there and may be provided in the entire first optical sheet OS1. In this case, the transmittance of the transmittance adjustment area CA may be increased from the outer edge of the optical sheet OS1 on the opposite side to the light sources to the outer edge of the optical sheet OS1 on the light source side. Still further, if the transmittance adjustment area CA is provided in the entire first optical sheet OS1, the print layer should preferably be provided without reducing the transmittance of the display area DA.

Next, liquid crystal display devices and illumination devices according to modifications and other embodiments will be described. In the modifications and other embodiments which will be described below, the same portions as those of the first embodiment will be denoted by the same reference numbers and detailed description thereof will be omitted or simplified, and different portions from those of the first embodiment will be mainly described in detail.

First Modification of First Embodiment

FIG. 8A is a plan view schematically showing the illumination device 20 according to the first modification, and FIG. 8B is an enlarged plan view of an end portion of the illumination device 20 on the opposite side to the light sources in which the second optical sheet is omitted.

According to the first modification, four corner portions of the illumination device 20 are rounded in an arc-like manner. In the short side portion on the opposite side to the light sources, the dot pattern (print layer) DP which forms the transmittance adjustment area CA is formed and arranged along the corner portion toward the long side.

Second Modification of First Embodiment

Figure 9:
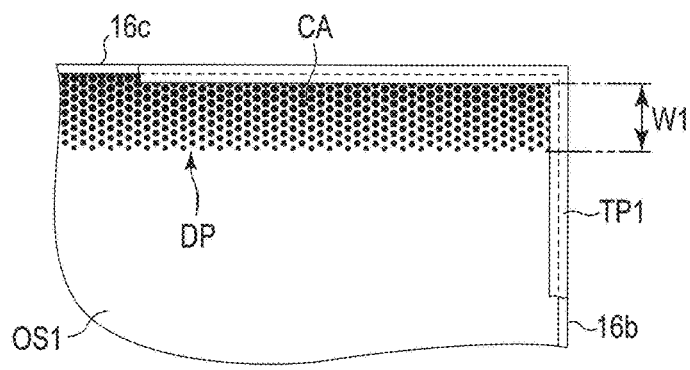
FIG. 9 is an enlarged plan view of a part of an illumination device according to a second modification of the first embodiment.

FIG. 9 is a plan view schematically showing a transmittance adjustment area of an illumination device according to the second modification of the first embodiment.

In the first embodiment, the dot pattern DP which forms the print layer is formed of a large number of circular dots having the same diameter and arranged with predetermined pitches. On the other hand, the dot pattern DP of the second modification is formed of a plurality of circular dots having different diameters. The dot pattern DP includes a plurality of dot lines extending parallel to the short side of the first optical sheet OS, and each dot line has a large number of circular dots arranged with predetermined pitches. Each dot line extends throughout the entire length of the short side. The dot lines are arranged in a direction perpendicular to the short side from the short side end of the first optical sheet OS 1 within the range of the width W1. The dot lines adjacent to the short side are formed of large-diameter circular dots, and from these dots lines to the dot line located on the display area side, the diameter of the circular dots gradually decreases. Also in the case of using this dot pattern DP, gradations can be added to the transmittance of the transmittance adjustment area CA. That is, the transmittance can be adjusted to be the lowest on the shorter side and to be gradually increased from the short side to the other edge of the transmittance adjustment area CA.

Third Modification of First Embodiment

Figure 10:
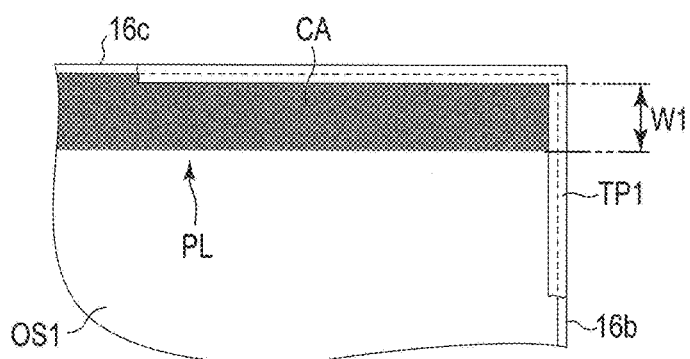
FIG. 10 is an enlarged plan view of a part of an illumination device according to a third modification of the first embodiment.

FIG. 10 is a plan view schematically showing a transmittance adjustment area of an illumination device according to the third modification of the first embodiment.

In the previously-described embodiment and modifications, the print layer of the transmittance adjustment area uses the dot pattern DP, but the print layer is not limited to this and may be a solid print layer, for example. As shown in FIG. 10, according to the fourth modification, the print layer of the transmittance adjustment area CA is a solid print layer PL having a predetermined width W1. The print layer PL is formed with ink having such color and darkness that can transmit a few percent of light, for example, gray ink. In the present embodiment, the print layer PL has the same color and the constant darkness throughout the entire width. The transmittance of the print layer PL is lower than the transmittance of the first optical sheet OS1. Therefore, the print layer PL blocks one part and transmits the other part of light which enters the optical sheet OS1 and can adjust the transmittance of the optical sheet in the transmittance adjustment area CA. The color of the print layer PL is not limited to gray and may be appropriately selected from other colors.

Fourth Modification of First Embodiment

In the previously-described embodiment and modifications, the print layer of the transmittance adjustment area does not necessarily have a single color, and the color of the dot pattern or solid print layer may be changed such that the transmittance will increase from the outer edge to the inner side of the optical sheet OS1. In this case, for example, the lightness of the dot pattern may be reduced toward the outer edge of the optical sheet OS1, the lightness of the dot pattern may be increased toward the inner side of the optical sheet OS1. Further, the border of the print layer PL can be made less visible by adding gradations the darkness, for example, by gradually reducing the darkness of the print layer PL from the short side of the optical sheet OS1 to the other edge of the transmittance adjustment area CA.

Figure 11:
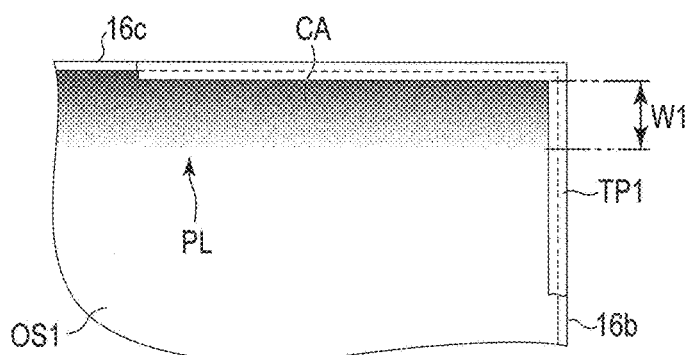
FIG. 11 is an enlarged plan view of a part of an illumination device according to a fourth modification of the first embodiment.

FIG. 11 is a diagram showing the present modification applied to the third modification of the first embodiment (FIG. 10). As shown in FIG. 11, the darkness of the print layer PL may be gradually reduced toward the other edge of the transmittance adjustment area CA. The transmittance of the print layer PL substantially corresponds to the darkness. Therefore, as the darkness of the print layer PL is gradually reduced, the transmittance of the print layer PL gradually increases, accordingly.

Second Embodiment

Figure 13:
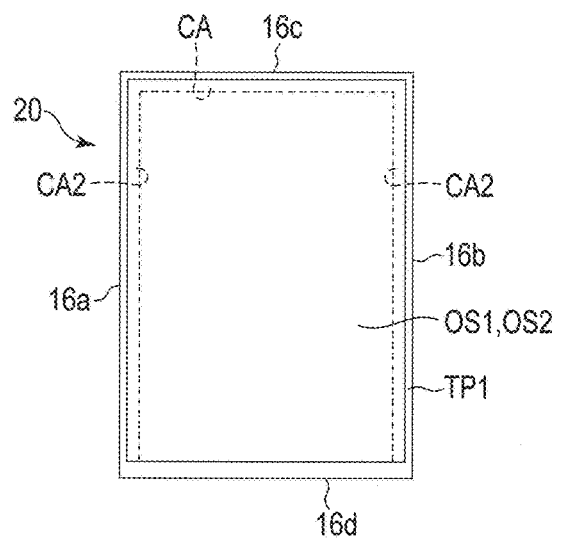
FIG. 13 is a plan view of an illumination device of the liquid crystal display device according to the second embodiment.
Figure 14:
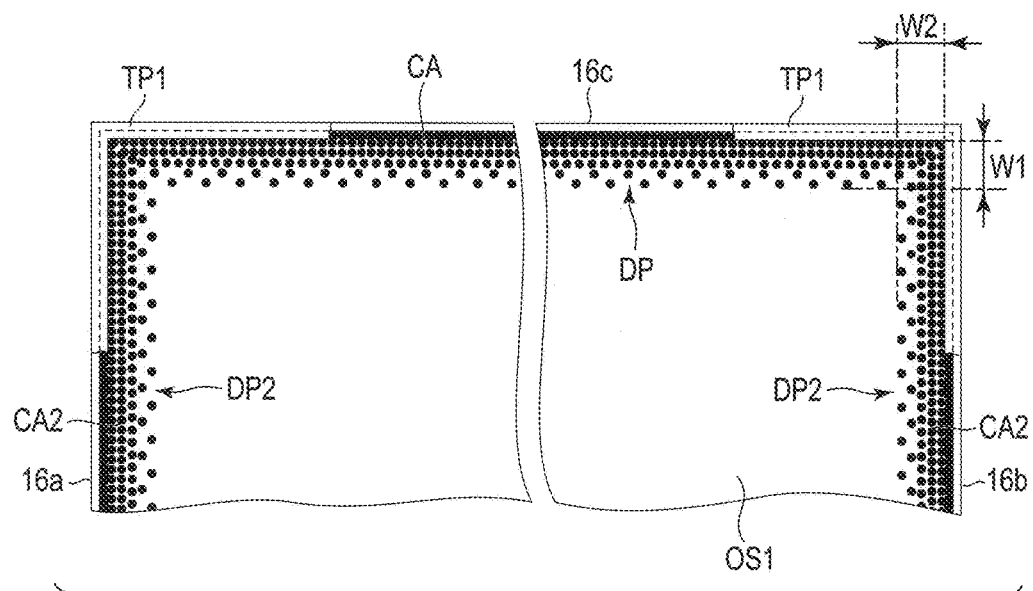
FIG. 14 is an enlarged plan view of a part of the illumination device shown in FIG. 13.

FIG. 12 is a sectional view of a long side portion of a liquid crystal display device according to the second embodiment, FIG. 13 is a plan view schematically showing an illumination device according to the second embodiment, and FIG. 14 is an enlarged plan view of an end portion of the illumination device on the opposite side to the light sources in which the second optical sheet is omitted.

As shown in FIG. 12, the light guide LG has a third side surface SS3 and a fourth side surface (not shown) on the longer side. According to the second embodiment, the light guide LG is sized and arranged such that the third side surface SS3 and the fourth side surface are located inside the display area DA.

As shown in FIGS. 13 and 14, the first optical sheet OS1 comprises a pair of second transmittance adjustment areas CA2 in addition to the previously-described transmittance adjustment area CA. The second transmittance adjustment areas CA2 are provided along the pair of long sides of the first optical sheet OS1 and have a width W2. Each second transmittance adjustment area CA2 has, for example, a dot pattern (print layer) DP2 printed with black ink in a long side end portion of the upper surface (surface on the liquid crystal panel 12 side) of the first optical sheet OS1. The dot pattern DP2 can have the same pattern structure as that of the dot pattern DP of the previously-described transmittance adjustment area CA.

In the second embodiment, the other structures of the illumination device 20 and the liquid crystal display device 10 are the same as those of the illumination device and the liquid crystal display device according to the first embodiment.

The second embodiment can achieve the same advantage as that of the first embodiment. Further, since the side surfaces of the light guide on the longer side are arranged inside the display area DA and the second transmittance adjustment areas CA2 are provided, the frame can be further narrowed while the emission of abnormal light is prevented concurrently.

Third Embodiment

Figure 15:
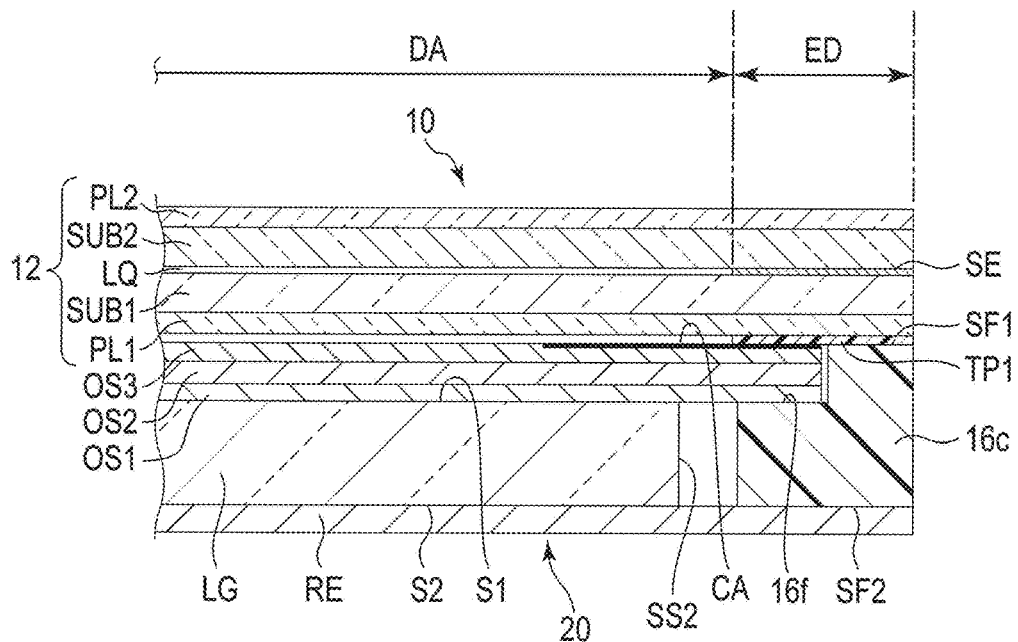
FIG. 15 is a sectional view of a liquid crystal display device according to a third embodiment.

FIG. 15 is a sectional view of a liquid crystal display device according to the third embodiment.

As shown in FIG. 15, the illumination device 20 of the present embodiment further comprises a third optical sheet OS3 overlaid on the second optical sheet OS2. The diffusion sheet is used as the third optical sheet OS3. The third optical sheet OS3 has the same outer dimensions (length and width) as those of the first optical sheet OS1 and the second optical sheet OS2. Therefore, the third optical sheet OS3 has an edge portion on the opposite side to the light sources which is arranged to cover the gap between the second side surface SS2 of the light guide LG and the display area DA.

In the third embodiment, the transmittance adjustment area CA is provided in the above-described edge portion of the third optical sheet OS3. The transmittance adjustment area CA has a print layer (dot pattern) in the edge portion of the upper surface (surface on the liquid crystal panel side) of the third optical sheet OS3. The same dot pattern as that of the first embodiment is used as the print layer (dot pattern).

In the third embodiment, the other structures of the illumination device 20 and the liquid crystal display device 10 are the same as those of the illumination device and the liquid crystal display device according to the first embodiment. The third embodiment having the above-described structure can also achieve the same advantage as that of the first embodiment.

Fourth Embodiment

Figure 16:
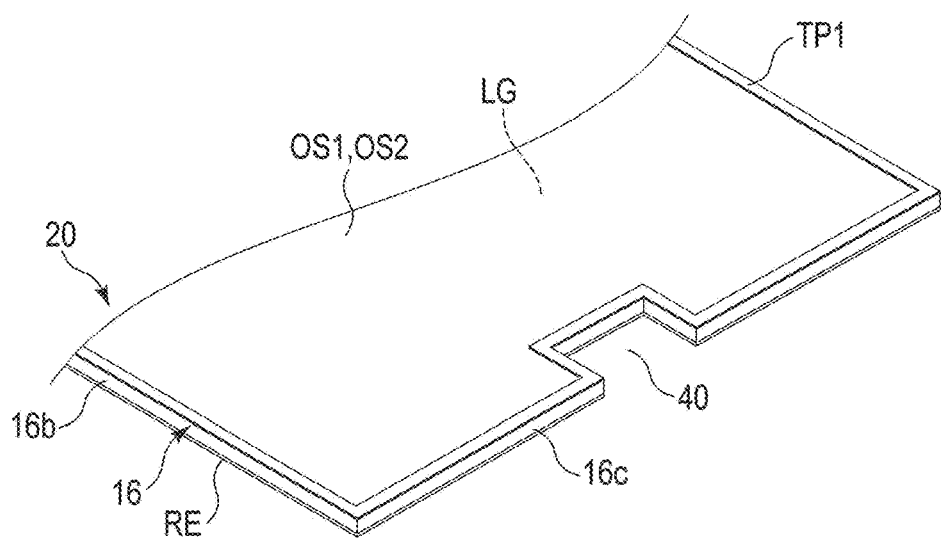
FIG. 16 is a perspective view of a part of an illumination device of a liquid crystal display device according to a fourth embodiment.
Figure 17:
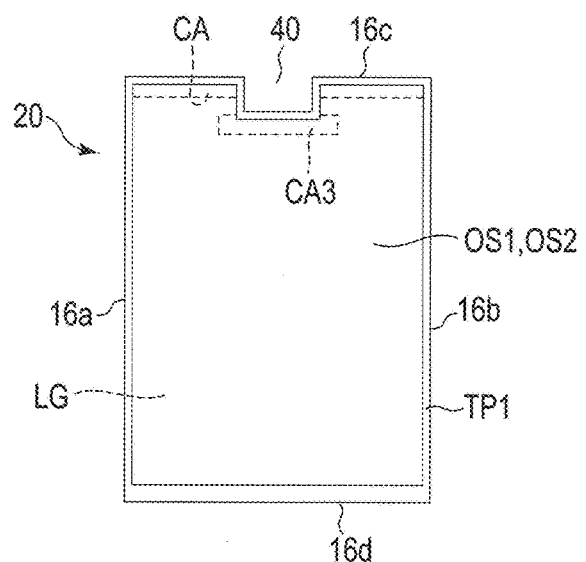
FIG. 17 is a plan view of the illumination device according to the fourth embodiment.
Figure 18:
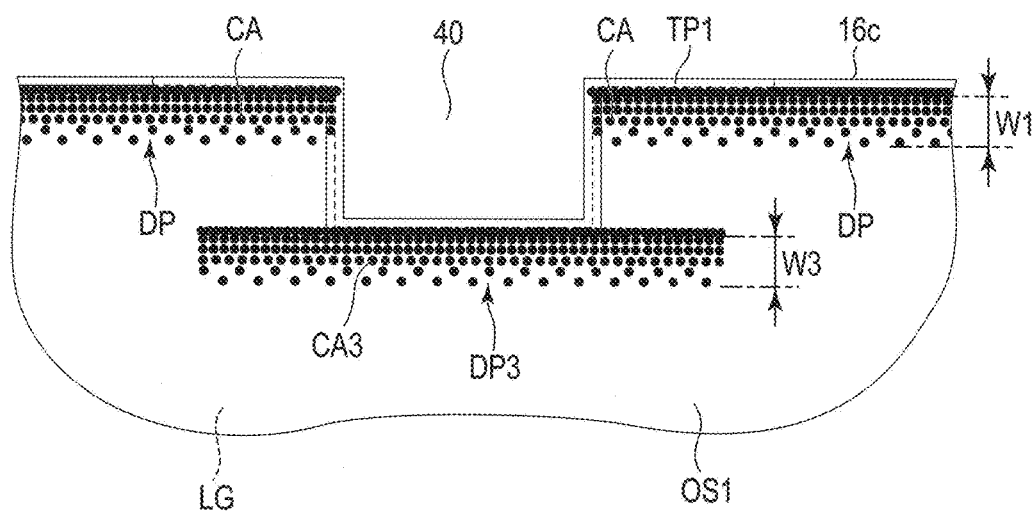
FIG. 18 is an enlarged plan view of a part of the illumination device shown in FIG. 17.

FIG. 16 is a perspective view showing a part of an illumination device according to the fourth embodiment, FIG. 17 is a plan view schematically showing the illumination device according to the fourth embodiment, and FIG. 18 is an enlarged plan view of an end portion of the illumination device on the opposite side to the light sources in which the second optical sheet is omitted.

In the present embodiment, as shown in FIGS. 16 and 17, the illumination device 20 has a recessed portion 40 formed in the short side portion 16c on the opposite side to the light sources. A substantially central portion of the short side portion 16c of the frame 16 in the longitudinal direction is bent inward, that is, to the display area DA side and defines the recessed portion 40 having a substantially rectangular shape. In conformity with the recessed portion 40, recessed portions are similarly formed at the side edges of the reflective sheet RE, the light guide LG, and the first and second optical sheets OS1 and OS2 on the opposite side to the light sources. A recessed portion is formed in the center portion of the second side surface SS2 (not shown) of the light guide LG on the opposite side to the light sources, and the bottom surface of the recessed portion is located inside the display area DA and is opposed to the bottom surface of the recessed portion 40 of the short side portion 16c at a distance from the recessed portion 40 of the short side portion 16c.

As shown in FIGS. 17 and 18, the edge portion of the first optical sheet OS1 and the edge portion of the second optical sheet OS2 on the opposite side to the light sources cover an area between the second side surface SS2 of the light guide LG and the edge of the display area DA and an area between the bottom surface of the recessed portion and the edge of the display area DA. In the present embodiment, the transmittance adjustment area CA and a third transmittance adjustment area CA3 are provided in the above-described edge portion of the first optical sheet OS1.

The transmittance adjustment area CA is provided along the short side of the first optical sheet OS1 and has the width W1. The third transmittance adjustment area CA3 is provided along the bottom edge of the recessed portion 40 formed in the short side of the first optical sheet OS1 and has a width W3. The third transmittance adjustment area CA3 extends on both sides of the recessed portion 40. The transmittance adjustment area CA has, for example, the dot pattern (print layer) DP printed with black ink in the short side edge portion of the upper surface (surface on the liquid crystal panel 12 side) of the first optical sheet OS1. Similarly, the third transmittance adjustment area CA3 has a dot pattern (print layer) DP3 printed on the upper surface of the first optical sheet OS1. The dot pattern DP and the dot pattern DP3 can have the same pattern structure as that of the dot pattern DP in the first embodiment.

In the fourth embodiment, the other structures of the illumination device 20 and the liquid crystal display device 10 are the same as those of the illumination device and the liquid crystal display device according to the first embodiment. However, in the liquid crystal display device, a recessed portion opposed to the recessed portion 40 of the illumination device 20 is formed in an end portion of the liquid crystal panel.

According to the fourth embodiment, even if a recessed portion is provided in a side edge portion of the illumination device, an illumination device and a liquid crystal display device which can have narrower frames while preventing the emission of abnormal light can be produced.

First Modification of Fourth Embodiment

Figure 19:
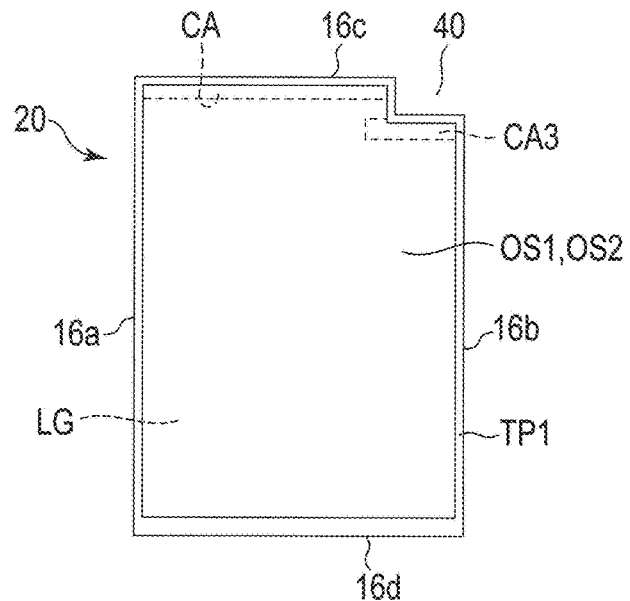
FIG. 19 is a plan view of an illumination device according to a first modification of the fourth embodiment.
Figure 20:
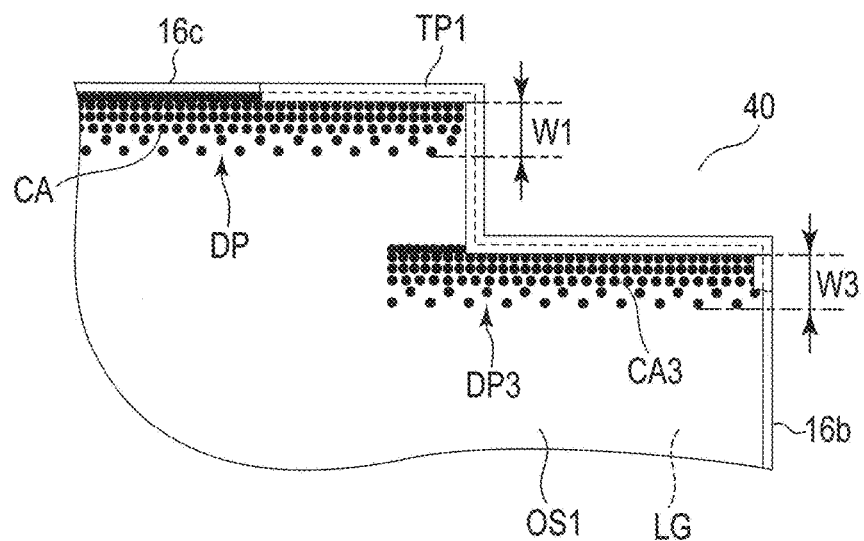
FIG. 20 is an enlarged plan view of a part of the illumination device shown in FIG. 19.

FIG. 19 is a plan view schematically showing an illumination device according to the first modification of the fourth embodiment, and FIG. 20 is an enlarged plan view of the illumination device shown in FIG. 19 in which the second optical sheet is omitted.

As shown in FIGS. 19 and 20, according to the first modification of the fourth embodiment, the recessed portion 40 of the illumination device 20 is formed in a corner portion of the short side portion 16c on the opposite side to the light sources. The edge portion of the first optical sheet OS1 and the edge portion of the second optical sheet OS2 on the opposite side to the light sources cover the area between the second side surface of the light guide LG and the edge of the display area DA and the area between the bottom surface of the recessed portion 40 and the edge of the display area DA. The transmittance adjustment area CA and the third transmittance adjustment area CA3 are provided in the above-described edge portion of the first optical sheet OS1.

The transmittance adjustment area CA is provided along the short side of the first optical sheet OS1 and has the width W1. The third transmittance adjustment area CA3 is provided along the bottom edge of the recessed portion 40 formed in the short side of the first optical sheet OS1 and has the width W3. The third transmittance adjustment area CA3 extends from one end of the recessed portion 40 to the display area side. The transmittance adjustment area CA has the printed dot pattern (print layer) DP in the short side edge portion of the upper surface (surface on the liquid crystal panel 12 side) of the first optical sheet OS1. Similarly, the third transmittance adjustment area CA3 has the dot pattern (print layer) DP3 printed on the upper surface of the first optical sheet OS1. The dot pattern DP and the dot pattern DP3 can have the same pattern structure as that of the dot pattern DP in the first embodiment.

In the first modification of the fourth embodiment, the other structures of the illumination device 20 and the liquid crystal display device 10 are the same as those of the illumination device and the liquid crystal display device according to the fourth embodiment.

Fifth Embodiment

FIG. 21 is a sectional view showing a part of a liquid crystal display device according to the fifth embodiment and a diagram showing an example of haze adjustment of an optical sheet.

In the present embodiment, as shown in FIG. 21, the transmittance of the transmittance adjustment area CA of the first optical sheet OS1 is reduced by adjusting the haze of the optical sheet. That is, the haze of the transmittance adjustment area CA of the first optical sheet OS1 is higher than the haze of the other area of the first optical sheet OS1.

In the present embodiment, the ratio of diffuse transmittance to total light transmittance (diffuse transmittance/total light transmittance) is indicated by using a haze as an indicator. As a transparent material is more whitish and cloudy, a haze becomes higher. For example, the haze of a PET film is about 4% and the haze of glass is 0%. For example, the haze of the first optical sheet OS1 is 10% or less, and the haze of the transmittance adjustment area CA is 50% or more. Since the haze of the transmittance adjustment area CA is increased, the transmittance of the transmittance adjustment area CA will be lower than that of the other area.

As shown by a characteristic line H1 in FIG. 21, the haze of the transmittance adjustment area CA may be constant. Alternatively, as shown by a characteristic line H2, the haze of the transmittance adjustment area CA may be gradually increased from the border to the short side end of the transmittance adjustment area CA. In the case of gradually increasing the haze, that is, in the case of adding gradations to the haze, the haze does not necessarily increase linearly as shown by the characteristic line H2. For example, the haze may be increased in a parabolic manner as shown by a characteristic line H3 in FIG. 21.

The haze of the first optical sheet OS1 can be adjusted by the following method. For example, the haze can be changed by applying a coating which contains transparent beads to at least one surface of the optical sheet and adjusting the density of beads. As the density of beads is higher, the haze becomes higher.

Alternatively, the haze can be changed by forming fine projections and depressions on the surface of the optical sheet by photolithography and adjusting the density of projections and depressions. For example, projections and depressions are formed on the surface of the transmittance adjustment area CA, and projections and depressions are not formed on the surface of the other area of the optical sheet. Gradations can be added to the haze by increasing the density of projections and depressions from the vicinity of the border to the other edge of the transmittance adjustment area CA. Projections and depressions may be formed not only on one surface of the optical sheet but also on both surfaces of the optical sheet.

In the fifth embodiment, the other structures of the illumination device 20 and the liquid crystal display device 10 are the same as those of the illumination device and the liquid crystal display device according to the first embodiment.

Also in the fifth embodiment having the above-described structure, the emission of abnormal light can be prevented by reducing the transmittance of the transmittance adjustment area of the optical sheet. Therefore, the fifth embodiment can also achieve the same advantage as that of the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

All structures that a person of ordinary skill in the art can implement through arbitrary design changes based on the structures described above as the embodiments of the present invention will also come within the scope of the present invention as long as they are in keeping with the spirit of the present invention. For example, the external and internal shapes of the liquid crystal panel, the components of the illumination device and the frame are not limited to a rectangular shape, and one or both of the external and internal shapes may be another shape such as a polygonal shape, a circular shape or an elliptical shape, or a combination thereof in a plan view. The liquid crystal display device and the illumination device are not necessarily flat and may be partially or entirely curved or inclined. The materials of the components are not limited to those of the above-described examples and may be selected from various other materials.

Further, when it comes to advantages other than those achievable from the above-described embodiments, advantages obvious from the description of the present specification and advantages appropriately conceivable by a person of ordinary skill in the art will be regarded as advantages achievable from the present invention as a matter of course.

The inventions described in the claims of the present application will be additionally described below.

(1) An illumination device comprising:

a light guide comprising an emission surface and a plurality of side surfaces which intersect the emission surface, wherein at least one side surface is located inside a display area;

a light source device which emits light to the light guide; and an optical sheet arranged on the emission surface and opposed to the display area, wherein the optical sheet includes an edge portion which covers an area between the one side surface and an edge of the display area, and a transmittance adjustment area which is provided in the edge portion and reduces a transmittance of the edge portion.

(2) The illumination device described in (1), wherein a transmittance of the transmittance adjustment area is lower than a transmittance of the optical sheet.

(3) The illumination device described in (2), wherein the transmittance adjustment area includes a first end on a center side of the optical sheet and a second end on an edge side of the optical sheet, and the transmittance of the transmittance adjustment area decreases from the first end to the second end.

(4) The illumination device described in (2), wherein the transmittance adjustment area includes a dot pattern in which a large number of dots are arranged, and the dot pattern is a print layer.

(5) The illumination device described in (4), wherein a dot density of the dot pattern decreases from an edge of the optical sheet to an inner side of the optical sheet.

(6) The illumination device described in (4), wherein a dot diameter of the dot pattern decreases from an edge of the optical sheet to an inner side of the optical sheet.

(7) The illumination device described in (2), wherein the transmittance adjustment area includes a solid print layer having a constant width.

(8) The illumination device described in (1), wherein a haze of the transmittance adjustment area is higher than a haze of other area of the optical sheet.

(9) The illumination device described in (8), wherein the haze of the transmittance adjustment area gradually increases from a border of the optical sheet on an inner side to an edge of the optical sheet.

(10) A liquid crystal display device comprising:
a liquid crystal panel comprising a display area; and
an illumination device opposed to the display area, wherein
the illumination device comprises:
a light guide having an emission surface and a plurality of side surfaces which intersect the emission surface, wherein at least one side surface is located inside the display area;
a light source device which emits light to the light guide; and
an optical sheet provided on the emission surface and opposed to the display area, wherein
the optical sheet comprises an edge portion which covers an area between the one side surface and an edge of the display area, and a transmittance adjustment area which is provided in the edge portion and reduces a transmittance of the edge portion.

(11) The liquid crystal display device described in (10), wherein a transmittance of the transmittance adjustment area is lower than a transmittance of the optical sheet.

(12) The liquid crystal display device described in (11), wherein the transmittance adjustment area includes a first end on a center side of the optical sheet and a second end on an edge side of the optical sheet, and the transmittance of the transmittance adjustment area decreases from the first end to the second end.

(13) The liquid crystal display device described in (11), wherein the transmittance adjustment area includes a dot pattern in which a large number of dots are arranged, and the dot pattern is a print layer.

(14) The liquid crystal display device described in (13), wherein a dot density of the dot pattern decreases from an edge of the optical sheet to an inner side of the optical sheet.

(15) The liquid crystal display device described in (13), wherein a dot diameter of the dot pattern decreases from an edge of the optical sheet to an inner side of the optical sheet.

(16) The liquid crystal display device described in (11), wherein the transmittance adjustment area includes a solid print layer having a constant width.

(17) The liquid crystal display device described in (10), wherein a haze of the transmittance adjustment area is higher than a haze of other area of the optical sheet.

(18) The liquid crystal display device described in (17), wherein the haze of the transmittance adjustment area gradually increases from a border of the optical sheet on an inner side to an edge of the optical sheet.

What is claimed is:

1. An illumination device comprising:
a light guide comprising an emission surface and a plurality of side surfaces which intersect the emission surface, wherein at least one side surface is located inside a display area;
a light source device which emits light to the light guide; and
an optical sheet arranged on the emission surface and opposed to the display area, wherein
the optical sheet includes an edge portion which covers an area between the one side surface and an edge of the display area, and a transmittance adjustment area which is provided in the edge portion and reduces a transmittance of the edge portion, wherein a haze of the transmittance adjustment area is higher than a haze of other area of the optical sheet.

2. The illumination device according to claim 1, wherein a transmittance of the transmittance adjustment area is lower than a transmittance of the optical sheet.

3. The illumination device according to claim 2, wherein the transmittance adjustment area includes a first end on a center side of the optical sheet and a second end on an edge side of the optical sheet, and the transmittance of the transmittance adjustment area decreases from the first end to the second end.

4. The illumination device according to claim 2, wherein the transmittance adjustment area includes a dot pattern in which a large number of dots are arranged, and
the dot pattern is a print layer.

5. The illumination device according to claim 4, wherein a dot density of the dot pattern decreases from an edge of the optical sheet to an inner side of the optical sheet.

6. The illumination device according to claim 4, wherein a dot diameter of the dot pattern decreases from an edge of the optical sheet to an inner side of the optical sheet.

7. The illumination device according to claim 2, wherein the transmittance adjustment area includes a solid print layer having a constant width.

8. The illumination device according to claim 1, wherein the haze of the transmittance adjustment area gradually increases from a border of the optical sheet on an inner side to an edge of the optical sheet.

9. A liquid crystal display device comprising:
a liquid crystal panel comprising a display area; and
an illumination device opposed to the display area, wherein
the illumination device comprises:
a light guide having an emission surface and a plurality of side surfaces which intersect the emission surface, wherein at least one side surface is located inside the display area;
a light source device which emits light to the light guide; and an optical sheet provided on the emission surface and opposed to the display area, wherein the optical sheet comprises an edge portion which covers an area between the one side surface and an edge of the display area, and a transmittance adjustment area which is provided in the edge portion and reduces a transmittance of the edge portion, wherein a haze of the transmittance adjustment area is higher than a haze of other area of the optical sheet.

10. The liquid crystal display device according to claim 9, wherein a transmittance of the transmittance adjustment area is lower than a transmittance of the optical sheet.

11. The liquid crystal display device according to claim 10, wherein the transmittance adjustment area includes a first end on a center side of the optical sheet and a second end on an edge side of the optical sheet, and the transmittance of the transmittance adjustment area decreases from the first end to the second end.

12. The liquid crystal display device according to claim 10, wherein the transmittance adjustment area includes a dot pattern in which a large number of dots are arranged, and the dot pattern is a print layer.

13. The liquid crystal display device according to claim 12, wherein a dot density of the dot pattern decreases from an edge of the optical sheet to an inner side of the optical sheet.

14. The liquid crystal display device according to claim 12, wherein a dot diameter of the dot pattern decreases from an edge of the optical sheet to an inner side of the optical sheet.

15. The liquid crystal display device according to claim 10, wherein the transmittance adjustment area includes a solid print layer having a constant width.

16. The liquid crystal display device according to claim 9, wherein the haze of the transmittance adjustment area gradually increases from a border of the optical sheet on an inner side to an edge of the optical sheet.

* * * * *